(12) United States Patent
Yamamoto (10) Patent No.: US 7,565,209 B2
(45) Date of Patent: Jul. 21, 2009

(54) DEVICE CONTROL APPARATUS

(75) Inventor: Kakuya Yamamoto, Ashiya (JP)

(73) Assignee: Panasonic Corporation, Osaka (JP)

( * ) Notice: Subject to any disclaimer, the term of this patent is extended or adjusted under 35 U.S.C. 154(b) by 158 days.

(21) Appl. No.: 10/587,321

(22) PCT Filed: Jun. 21, 2005

(86) PCT No.: PCT/JP2005/011362

§ 371 (c)(1),
(2), (4) Date: Jul. 26, 2006

(87) PCT Pub. No.: WO2006/003817

PCT Pub. Date: Jan. 12, 2006

(65) Prior Publication Data

US 2007/0176786 A1    Aug. 2, 2007

(30) Foreign Application Priority Data

Jul. 2, 2004    (JP) .............................. 2004-196530

(51) Int. Cl.
*G05B 11/01*    (2006.01)
(52) U.S. Cl. ................. 700/19; 700/3; 700/9; 700/295; 700/296
(58) Field of Classification Search ................... 700/19, 700/9, 3
See application file for complete search history.

(56) References Cited

U.S. PATENT DOCUMENTS

| | | | | |
|---|---|---|---|---|
| 5,968,138 | A | * | 10/1999 | Clough ........................... 710/8 |
| 6,405,310 | B1 | * | 6/2002 | Simpson ........................ 713/1 |
| 2006/0036449 | A1 | | 2/2006 | Araki et al. |

FOREIGN PATENT DOCUMENTS

| | | |
|---|---|---|
| CN | 1186973 A | 7/1998 |
| CN | 1418336 | 5/2003 |
| DE | 100 06 416 | 11/2000 |
| JP | 2000-069077 | 3/2000 |
| JP | 2000-311129 | 11/2000 |
| JP | 2003-153348 | 5/2003 |
| WO | 01/63389 | 8/2001 |
| WO | 2004/049224 | 6/2004 |

* cited by examiner

*Primary Examiner*—Kidest Bahta
*Assistant Examiner*—Nathan Laughlin
(74) *Attorney, Agent, or Firm*—Wenderoth, Lind & Ponack L.L.P.

(57) ABSTRACT

A device control apparatus (100) according to the present invention includes: a specification-conforming device identification unit (105) which identifies a device which conforms to a specification-related condition that should be satisfied by a device with an abstract name described in the application; a use situation-conforming device identification unit (106) which identifies a device which conforms to a use situation-related condition that should be satisfied by a device with an abstract name described in the application; and a device control unit (109) which controls, based on the application, the device identified by both the specification-conforming device identification unit (105) and the use situation-conforming device identification unit (106).

12 Claims, 10 Drawing Sheets

Tardiness prevention application

| |
|---|
| TimeKeeper. detectWakeupTime (); ← L01 |
| WakeUpper. Wakeup (); ← L02 |
| Chef. serveBreakfast (); ← L03 |
| . . . |

FIG. 4

Condition definition table (for the WakeUpper)

| Specification condition | Use situation condition |
|---|---|
| Alarm function | Use location: Bedroom<br>Use time: Morning |

FIG. 5

Specification association table (Yes:Y, No:N)

|  | Alarm function | Light function | On-timer reproduction function |
|---|---|---|---|
| Clock 11 | Y | N | N |
| Clock 12 | Y | N | N |
| Light 13 | N | Y | N |
| Television 14 | N | N | Y |
| Television 15 | N | N | Y |

FIG. 6

Use situation association table

| Device | Use location | Use time | Situation |
|---|---|---|---|
| Clock 11 | Kitchen | Morning, Evening | No record of manipulation |
| Clock 12 | Bedroom | Morning, Night | Manipulate every morning |
| Light 13 | Bedroom | Night | Manipulate every night |
| Television 14 | Kitchen | Morning, Evening, Night | Manipulate every evening |
| Television 15 | Bedroom | Morning, Night | Manipulate every night |

WakeUpper

[Specification condition]
- ◉ Alarm function
- ○ Light function
- ○ On-timer reproduction function

[Use situation condition]

(Use location)  ○ Kitchen   ◉ Bedroom   ○ Living room (Use time)  ☑ Morning   ☐ Daytime   ☐ Evening   ☐ Night

FIG. 10

Condition definition table (for the WakeUpper)

| Specification condition | Use situation condition |
|---|---|
| On-timer reproduction function | Use location: Bedroom<br>Use time: Morning |

Specification association table (Yes:Y, No:N)

| | Alarm function | Light function | On-timer reproduction function | Mass | Color |
|---|---|---|---|---|---|
| Clock 11 | Y | N | N | 100g | Black |
| Clock 12 | Y | N | N | 320g | White |
| Light 13 | N | Y | N | 870g | White |
| Television 14 | N | N | Y | 20kg | Black |
| Television 15 | N | N | Y | 3.2kg | Silver |

DEVICE CONTROL APPARATUS

TECHNICAL FIELD

The present invention relates to an apparatus which controls a plurality of devices, and particularly to an apparatus which controls a plurality of home appliances to operate in linkage with each other.

BACKGROUND

In recent years, by controlling appliances in a home to operate in linkage with each other, systems for providing various services have been proposed. These systems are realized by executing an application program (hereinafter referred to simply as "application") for controlling a plurality of devices to operate in linkage with each other.

In general, information which specifically identifies the home appliances to be controlled to operate in linkage with each other is described in the application. However, normally, the combination of home appliances owned by a user of the application is different for each user, and it is costly to create individual applications to conform to each user. Therefore, there is a method which expands the versatility of the application by describing, in the application, an abstract device name instead of a specific device name (for example, see Patent Document 1).

This method distinguishes the device based on whether or not it is equipped with the function required. In other words, information that represents an abstract device, such as "output video to a device equipped with a video display function" and "input sound from a device equipped with a sound microphone function", is described in the application. In this manner, there is no need to specifically identify the devices that are controlled to operate in linkage with each other; therefore, the application can be made more versatile.

Patent Document 1: Japanese Laid-Open Patent Application No. 2003-153348 Publication

DISCLOSURE OF INVENTION

Problems that Invention is to Solve

However, in the aforementioned existing technology, a device is distinguished based on whether or not it is equipped with the function required; therefore, there are some cases where a device which is actually useless to the user is operated. In other words, whether or not the device is actually useful to the user normally cannot be distinguished only from the device's functional aspects.

The present invention is to solve the aforementioned conventional problem, and an object of the present invention is to provide a device control apparatus which can appropriately identify a device that can achieve a purpose of an application.

Means to Solve the Problems

In order to achieve the aforementioned objective, the device control apparatus in the present invention is a device control apparatus that controls a plurality of devices, which includes: a specification association table obtainment unit for obtaining a specification association table in which a device and a specification of the device are associated with each other; a use situation association table obtainment unit for obtaining a use situation association table in which a device and a use situation of the device are associated with each other; an application obtainment unit for obtaining an application program in which a device to be controlled is described by an abstract name; a condition definition table obtainment unit for obtaining a condition definition table in which conditions that should be satisfied by the device with the abstract name are defined, the conditions being a specification-related condition and a use situation-related condition; a specification-conforming device identification unit for identifying, by referring to the condition definition table, the specification-related condition that should be satisfied by the device with the abstract name described in the application program, and for identifying, by referring to the specification association table, the device with the specification which conforms to the identified condition; a use situation-conforming device identification unit for identifying, by referring to the condition definition table, the use situation-related condition that should be satisfied by the device with the abstract name described in the application program, and for identifying, by referring to the use situation association table, the device with the use situation which conforms to the identified condition; and a device control unit for controlling, based on the application program, the device identified by the specification-conforming device identification unit and which is also identified by the use situation-conforming device identification unit. With this, a device to be controlled is identified, based not only on the specification, but also on the use situation of the device. As such, it is possible to appropriately identify a device that can achieve a purpose of an application.

Here, the abstract name is a generic name of a device that can carry out a specific role. With this, the device to be controlled can be described by a more abstract name; therefore, the application can be made more versatile.

To be more specific, a set of the device with the abstract name and a command to the device is described in the application program. As such, in the case where the structure of an application program is simplified, such application program can be created easily.

Here, the device control apparatus may further include a change unit for changing details in the condition definition table. With this, details of the condition definition table can be changed, based on individual circumstances. In other words, a condition for identifying a device to be controlled can be changed without modifying the application.

Furthermore, the specification of the device may include a functional specification of the device, and a formal specification of the device. With this, from a viewpoint of the functional specification of the device and the formal specification of the device, it is possible to appropriately identify a device that can achieve a purpose of an application.

Furthermore, the use situation of the device may include a location at which the device is present, and time at which the device is present. With this, from a viewpoint of the location at which the device is present and time at which the device is present, it is possible to appropriately identify a device that can achieve a purpose of an application.

Furthermore, the use situation of the device may include a location at which the device is used by a user, and time at which the device is used by the user. With this, from a viewpoint of the location at which the device is used by the user and time at which the device is used by the user, it is possible to appropriately identify a device that can achieve a purpose of an application.

Furthermore, the use situation of the device may include any one of a past record of the use situation, a current use situation, and a prediction for the use situation. With this, it is possible to appropriately identify a device that can achieve a purpose of an application from any one of the following viewpoints: the past record of the use situation; the current use situation; and the prediction for the use situation.

Furthermore, in the condition definition table, a plurality of conditions that should be satisfied by the device may be defined, for a single device, the conditions being specification-related conditions and use situation-related conditions. With this, as the condition for identifying the device to be controlled can be more complex, it is possible to more appropriately identify a device that can achieve a purpose of an application.

Furthermore, a priority relation among the plurality of conditions may be defined in the condition definition table. With this, it is possible to easily define complex conditions.

Furthermore, a plurality of users may share any of a part and a whole of the condition definition table. With this, it is possible to use the knowledge of others, and at the same time, to easily define various conditions.

Moreover, the present invention can be realized, not only as the aforementioned device control apparatus, but also as a device control method having the characteristic units of the aforementioned device control apparatus as steps, and as a program causing a computer to execute such steps. Furthermore, it goes without saying that such program can be distributed via a recording medium, such as a CD-ROM and the like, and via a transmission medium, such as the Internet and the like.

Effects of the Invention

As clearly shown in the aforementioned explanation, in the present invention of the device control apparatus, a device to be controlled is identified, based not only on the specification, but also on the use situation of the device. As such, it is possible to appropriately identify a device that can achieve a purpose of an application.

Furthermore, in the present invention of the device control apparatus, a condition for identifying a device to be controlled can be changed without modifying the application. Moreover, in the application of the present invention, the device is abstracted from a viewpoint of whether or not the device can carry out a specific role. Therefore, it becomes possible to change, without modifying the application, a specification condition which a device to be operated should be equipped with.

NUMERICAL REFERENCES

100 Device control apparatus
101 Application obtainment unit
102 Interpretation unit
103 Condition definition table obtainment unit
104 Specification association table obtainment unit
105 Specification-conforming device identification unit
106 Use situation-conforming device identification unit
107 Use situation association table obtainment unit
108 Device identification unit
109 Device control unit
110 Application storage unit
111 Condition definition table storage unit
112 Specification association table storage unit
113 Use situation association table storage unit
120 Condition change unit

BEST MODE FOR CARRYING OUT THE INVENTION

The embodiments of the present invention are described hereinafter with reference to the diagrams.

First Embodiment

Figure 1:
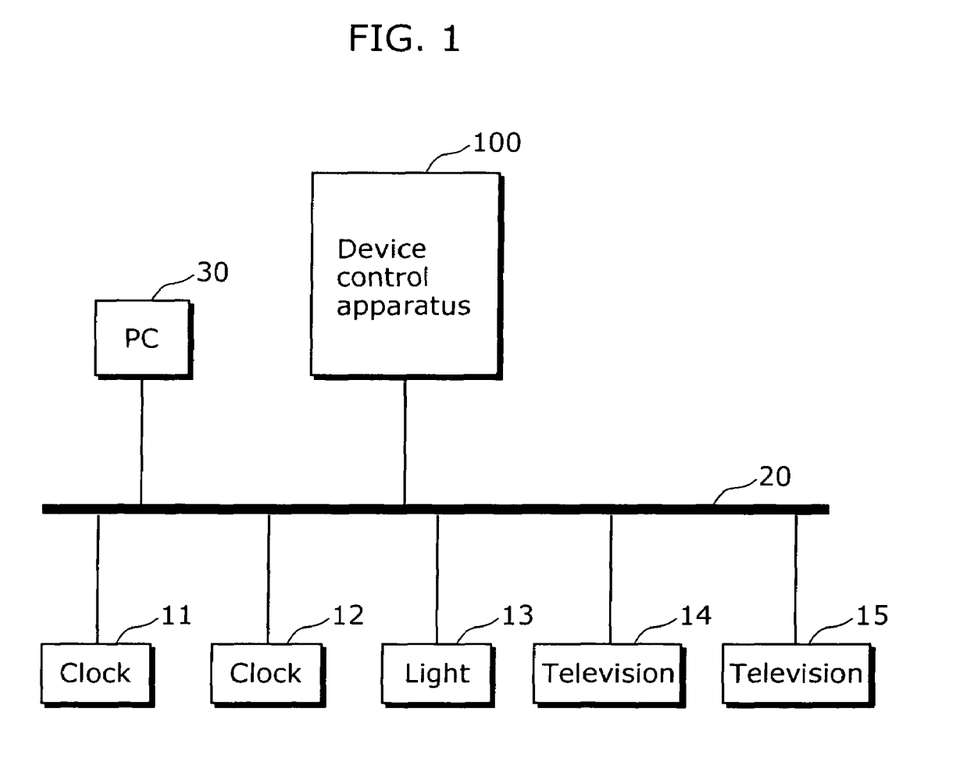
FIG. 1 is a diagram showing the use environment of the device control apparatus.

FIG. 1 is a diagram showing the use environment of a device control apparatus 100 in the first embodiment of the present invention. Here, the status is shown where a clock 11, a clock 12, a light 13, a television 14, a television 15, a personal computer (PC) 30, and a device control apparatus 100 in the home are connected via a network 20. The network 20 may be a wireless network using a wireless communication protocol, such as the Bluetooth and the like, or a wired network, such as a power line network and the like.

The device control apparatus 100 is an apparatus for controlling the devices 11 to 15 to operate in linkage with each other. In other words, by obtaining information from the devices 11 to 15, processing the obtained information, and providing the processed information to the devices 11 to 15, the devices 11 to 15 are controlled to operate in linkage with each other. However, the details of the linked operation are not particularly limited, as it depends on the details of the application operating on the device control apparatus 100.

Figure 2:
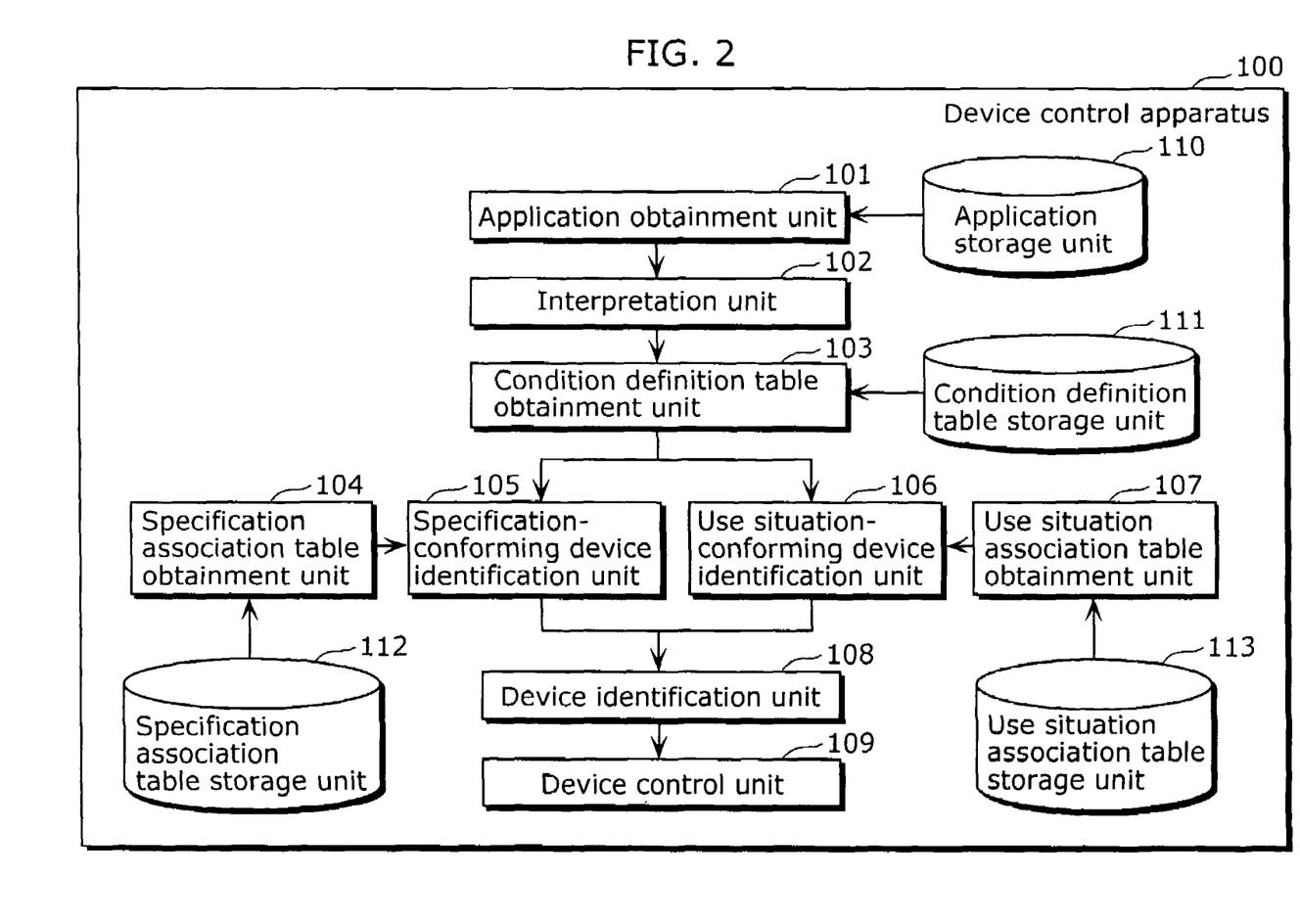
FIG. 2 is a diagram of the structure of the device control apparatus.

FIG. 2 is a diagram of the structure of the device control apparatus 100 in the first embodiment of the present invention. The device control apparatus 100 is, functionally, equipped with an application obtainment unit 101, an interpretation unit 102, a condition definition table obtainment unit 103, a specification association table obtainment unit 104, a specification-conforming device identification unit 105, a use situation-conforming device identification unit 106, a use situation association table obtainment unit 107, a device identification unit 108, a device control unit 109, an application storage unit 110, a condition definition table storage unit 111, a specification association table storage unit 112, and a use situation association table storage unit 113.

The specification association table storage unit 112 is a hard disk and the like that stores the specification association table. The use situation association table storage unit 113 is a hard disk and the like that stores the use situation table. The application storage unit 110 is a hard disk and the like that stores the application. The condition definition table storage unit 111 is a hard disk and the like that stores the condition definition table.

The application obtainment unit 101 obtains the application stored in the application storage unit 110. The interpretation unit 102 interprets the application obtained by the application obtainment unit 101. The condition definition table obtainment unit 103 obtains the condition definition table stored in the condition definition table storage unit 111.

The specification association table obtainment unit 104 obtains the specification association table stored in the specification association table storage unit 112. The specification-conforming device identification unit 105 identifies the device which conforms to the condition (to be described later) concerning the specification, by referring to the specification association table obtained by the specification association table obtainment unit 104.

The use situation association table obtainment unit 107 obtains the use situation association table stored in the use situation association table storage unit 113. By referring to the use situation association table obtained by the use situation association table obtainment unit 107, the use situation-conforming device identification unit 106 identifies the device conforming to the use situation (to be described later).

The device identification unit 108 identifies the device identified by the specification-conforming device identification unit 105 and the use situation-conforming device identification unit 106. The device control unit 109 controls the device identified by the device identification unit 108, based on the application.

Figure 3:
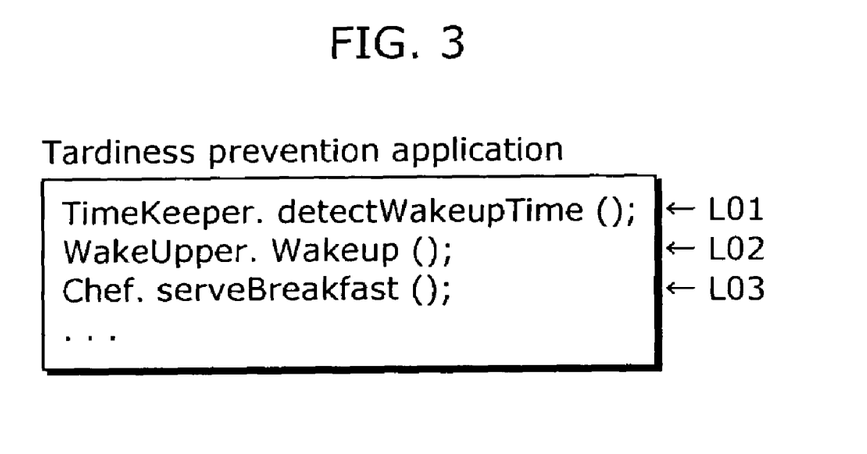
FIG. 3 is a diagram showing an example of the description of an application.

FIG. 3 is a diagram showing an example of the description in the tardiness prevention application. The tardiness prevention application is an application that supports the user, during the period between waking up until leaving home, so as not to be late.

A command L01 described in the first line is a command to a device of known as TimeKeeper, and is a command, meaning "detect the time to wake-up". A command L02 described in the second line is a command to a device of known as WakeUpper, and is a command, meaning "wake up the user". A command L03 described in the third line is a command to a device of known as Chef, and is a command, meaning "help prepare breakfast".

In this manner, according to the application in the present invention, an abstract device name, such as "TimeKeeper", "Wake-Upper", and "Chef", and not a specific device name is described. In addition, this abstract name is a generic name of a device which can carry out a specific role, and is different from the abstract name conventionally used. In other words, conventionally, the device is abstracted from a viewpoint of whether or not the device has function required, such as "a device equipped with the alarm function". On the other hand, for the present invention, the device is abstracted from a viewpoint of whether or not the device can carry out a specific role. Accordingly, as there is no need to describe the function of operated devices in the application, the application can be made more versatile.

Figure 4:
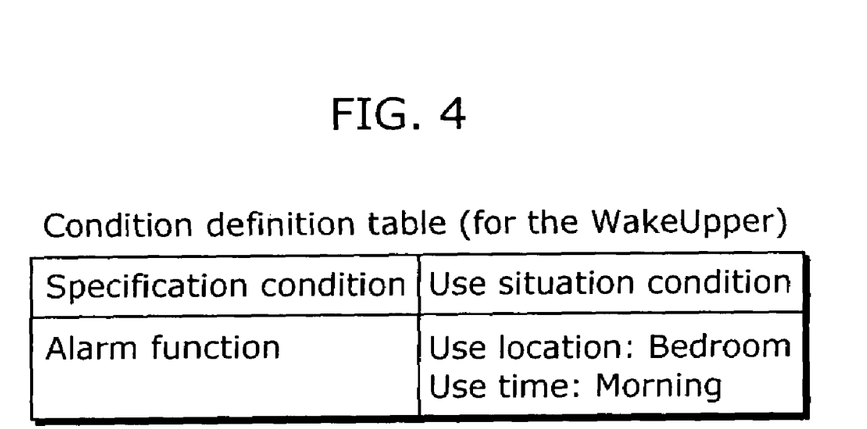
FIG. 4 is a diagram showing the condition definition table.

FIG. 4 is a diagram showing the condition definition table for the WakeUpper. Here, only the condition definition table for the WakeUpper is described; however, a similar condition definition table exists separately for the TimeKeeper and the Chef.

The condition definition table is a table that defines a condition to be satisfied by a device with an abstract name. Here, the conditions include a condition concerning the specification (specification condition) and a condition for the use situation (use situation condition).

As the specification condition for the WakeUpper, a condition meaning "equipped with an alarm function" is defined. Furthermore, as the use situation condition, a condition meaning "present in the bedroom in the morning" is defined.

Figure 5:
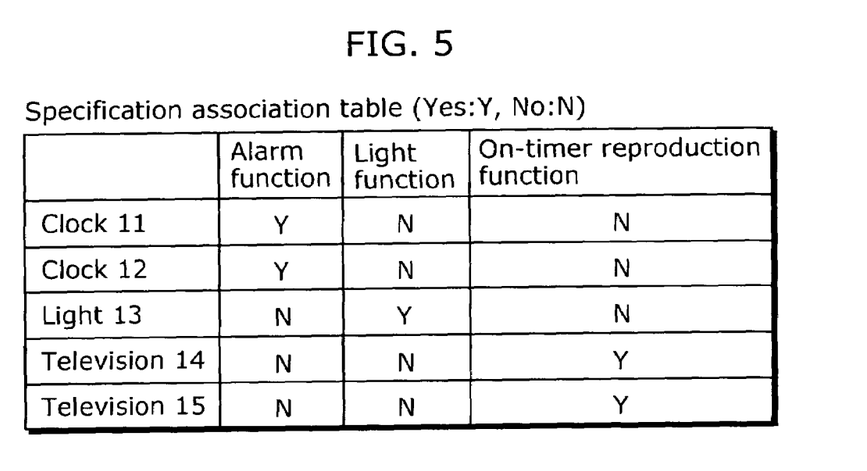
FIG. 5 is a diagram showing the specification association table.

FIG. 5 is a diagram showing the specification association table. The specification association table is a table that associates a device with a specification of the device.

As shown in FIG. 5, the specification association table in the first embodiment of the present invention associates the five devices 11 to 15 owned by the user with the respective specification of such devices 11 to 15. "Y" in the diagram means that a device is equipped with a corresponding function, and "N" in the diagram means that a device is not equipped with a corresponding function. For example, the diagram shows that the clock 11 is equipped with an alarm function, and is equipped with neither a light function nor an on-timer reproduction function.

Figure 6:
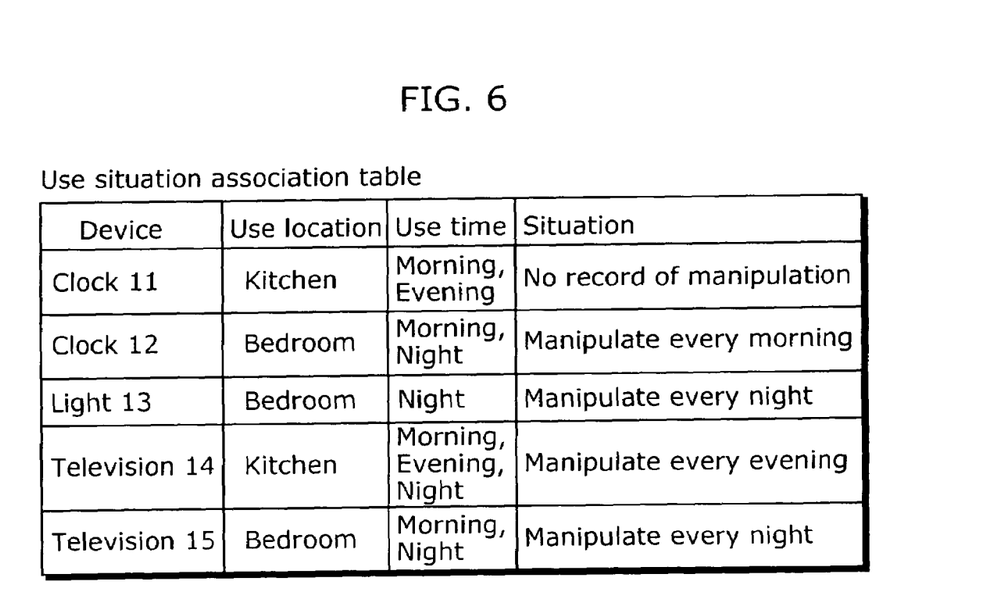
FIG. 6 is a diagram showing the use situation association table.

FIG. 6 is a diagram showing the use situation association table. The use situation association table is a table that associates a device with a use situation.

As shown in FIG. 6, the use situation association table in the first embodiment of the present invention associates the five devices 11 to 15 with the respective use situation of such devices 11 to 15. For example, it is shown that the clock 11 is placed in the kitchen, and used by the user in the morning and evening, and that there is no record of the past manipulation.

Figure 7:
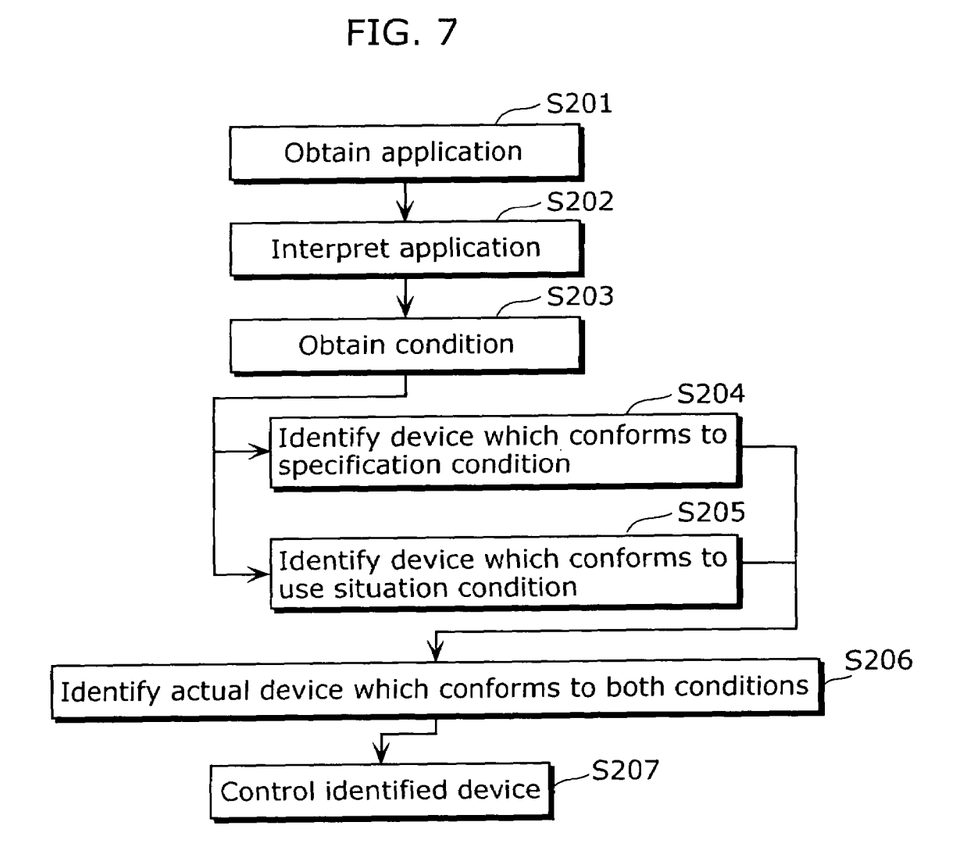
FIG. 7 is a flowchart showing the operation of the device control apparatus.

FIG. 7 is a flowchart showing the operation of the device control apparatus 100 in the first embodiment of the present invention. Hereinafter, the operation in which the device control apparatus 100 identifies an appropriate device is described.

The application obtainment unit 101 obtains an application from the application storage unit 110 (S201). Here, it is assumed that among a plurality of applications, the tardiness prevention application shown in FIG. 3 is obtained.

The interpretation unit 109 interprets the application obtained by the application obtainment unit 101 (S202). Then, in the case where an abstract device name is described, the name is extracted. Here, as it is assumed that the tardiness prevention application shown in FIG. 3 is interpreted, the names "TimeKeeper", "Wake-Upper", and "Chef" are extracted.

Hereinafter, a specific device which conforms to the condition of "TimeKeeper", "Wake-Upper", and "Chef" is identified. Here, only the WakeUpper is described; however, in the case such as this where plural names are extracted, a similar identification process is executed for each name. Such identification processes may be executed in sequence, or all at once.

First, the condition definition table obtainment unit 103 obtains a condition definition table from the condition definition table storage unit 111 (S203). Here, the condition definition table shown in FIG. 4 is obtained.

Here, the specification-conforming device identification unit 105 identifies a device which conforms to the specification condition of the WakeUpper (S204). In other words, as shown in FIG. 4, the WakeUpper must be equipped with the alarm function. Therefore, the specification-conforming device identification unit 105 identifies the clock 11 and the clock 12 which are equipped with the alarm function, by referring to the specification association table shown in the FIG. 5. Furthermore, the specification association table shown in the FIG. 5 can be obtained from the specification association table storage unit 112 via the specification association table obtainment unit 104.

On the other hand, the use situation-conforming device identification unit 106 identifies a device which conforms to the use situation condition of the WakeUpper (S205). In other words, as shown in FIG. 4, the WakeUpper must be present in the bedroom in the morning. Therefore, the use situation-conforming device identification unit 106 identifies the clock 12 and the television 15 which are present in the bedroom in the morning, by referring to the use situation association table shown in FIG. 6. Furthermore, the use situation association table shown in FIG. 6 can be obtained from the use situation association table storage unit 113 via the use situation association table obtainment unit 107.

In this manner, the device identification unit 108 identifies, as the WakeUpper, the device identified by the specification-conforming device identification unit 105, and at the same time identified by the use situation-conforming device identification unit 106. Here, the clock 11 and the clock 12 are identified by the specification-conforming device identification unit 105, and the clock 12 and the television 15 are identified by the use situation-conforming device identification unit 106. Therefore, the clock 12 is identified as the WakeUpper.

Finally, the device control unit 109 controls the WakeUpper, based on the application (S207). Here, as the clock 12 is identified as the WakeUpper, a command "wakeup( )" which means "wake up the user" is issued to the clock 12.

Accordingly, the clock 12 which is present in the bedroom rings at the predetermined time. Here, the predetermined time is the time detected by the Timekeeper. The method by which the TimeKeeper detects the time when the user should wake up is not particularly limited, and, for example, in the case where schedule information is registered in the personal computer 30, such schedule information may be referred to.

As described above, according to the first embodiment of the present invention, a device to be controlled is identified, based not only on the specification, but also on the use situation of the device. As such, the device which can achieve the purpose of the application can be appropriately identified.

In other words, according to the existing technology, a device is distinguished, based on whether or not the device is equipped with the function required. Therefore, there are some cases where a device which is actually useless to the user is operated. For example, it is assumed that a device equipped with an alarm function is described in the application for the purpose of waking up the user. In this case, even when the device equipped with the alarm function can be operated, if the device is placed in the kitchen, far away from the bedroom, there may be some cases when the purpose of waking up the user can not be achieved.

Conversely, according to the first embodiment of the present invention, the device to be controlled is identified, based on not only the specification, but also the use situation of the device. Therefore, as previously described, the clock 12 which is present in the bedroom is operated, and the user can be awakened without fail.

Second Embodiment

The first embodiment of the present invention is described, on the premise that the specification condition and the use situation condition are defined in the condition definition table in advance. In the second embodiment of the present invention, a technique which changes the details of the condition definition table is described.

Figure 8:
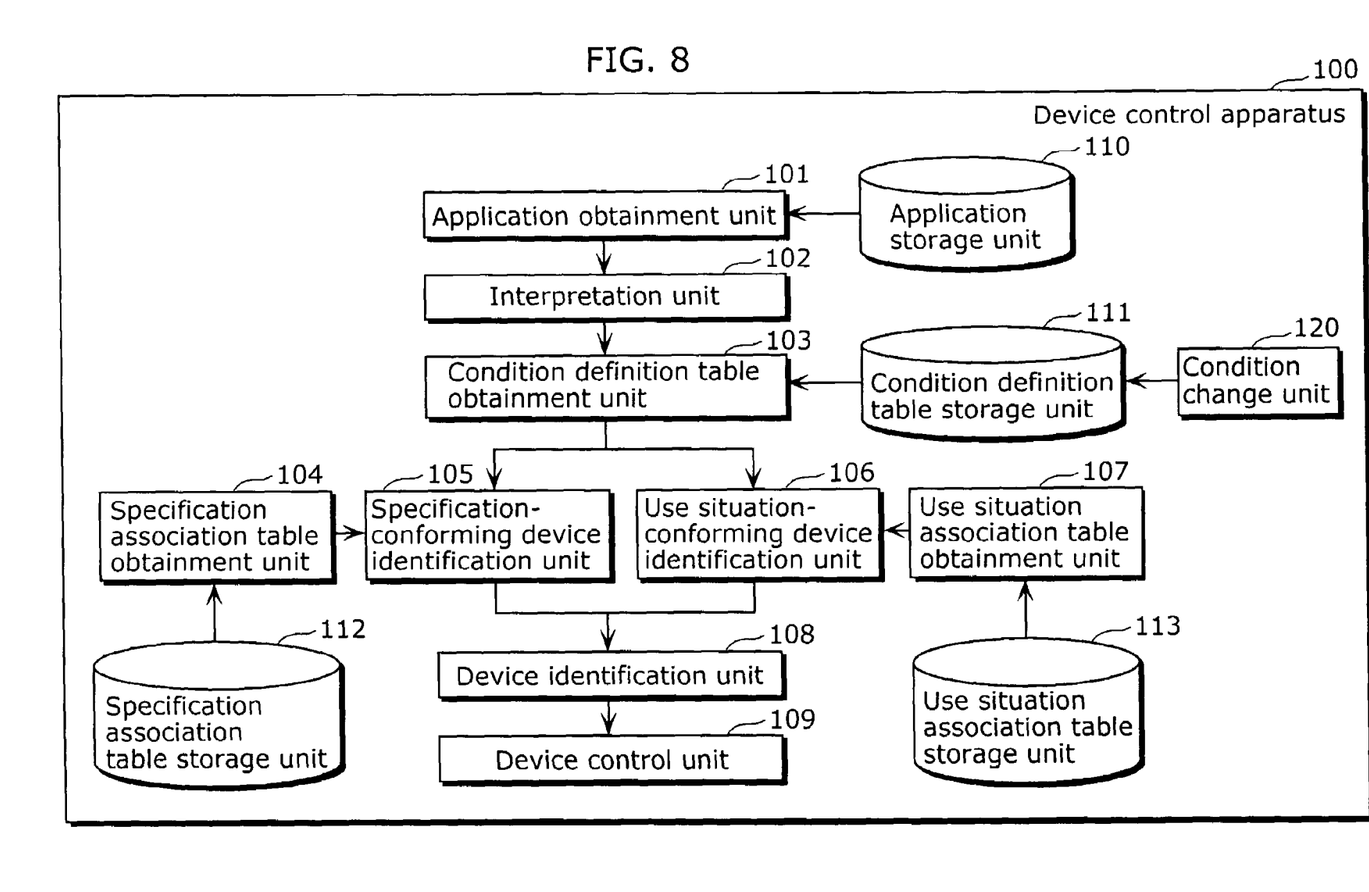
FIG. 8 is a diagram of the structure of the device control apparatus.

FIG. 8 is a diagram of the structure of the device control apparatus 100 in the second embodiment of the present invention. In addition to the structure described in the first embodiment of the present invention, this device control apparatus 100 is equipped with a condition change unit 120.

The condition change unit 120 changes the details of the condition definition table stored in the condition definition table storage unit 111. The method which issues a command to the condition change unit 120 is not particularly limited, and for example, a method using the personal computer 30, which is connected to the device control apparatus 100 via and the network 20, can be adopted.

Figure 9:
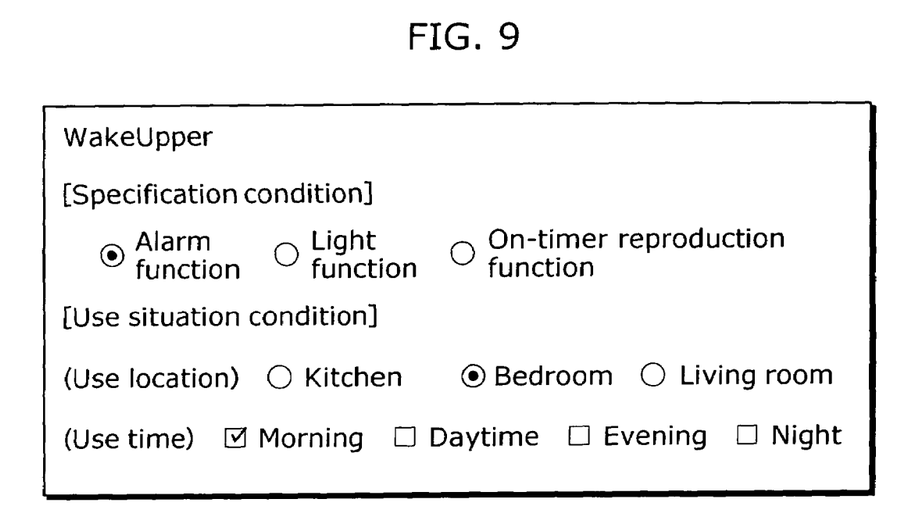
FIG. 9 is a diagram showing an example of a condition-change screen.

FIG. 9 is a diagram showing an example of a condition-change screen for the WakeUpper. As shown in this diagram, any one of the following can be selected as the condition concerning the specification of the WakeUpper: equipped with an alarm function; equipped with a light function; and equipped with an on-timer reproduction function. In addition, any one of the following can be selected as the condition regarding the use location of the WakeUpper: used in the kitchen; used in the bedroom; and used in the living room. Furthermore, plural conditions can be designated among the following as the condition concerning the use time for the WakeUpper: used in the morning; used in the daytime; used in the evening; and used in the night.

Hereinafter, the operation for changing the details of a condition definition table is described. Here, the tardiness prevention application, described in the first embodiment of the present invention, is exemplified for the explanation.

First, as shown in the FIG. 4, the specification condition meaning "equipped with the alarm function" is defined in the condition definition table for the WakeUpper. This enables the clock 12 and the like to operate, as described in the first embodiment of the present invention.

Here, it is assumed that the user wants to be awakened not by the alarm but by a morning television program. In this case, the user changes the details of the condition definition table stored in the condition definition table storage unit 1111. For example, the condition-change screen for the WakeUpper (refer to FIG. 9) is displayed on the display of the personal computer 30. Then, the specification condition is switched from the alarm function to the on-timer reproduction function.

Figure 10:
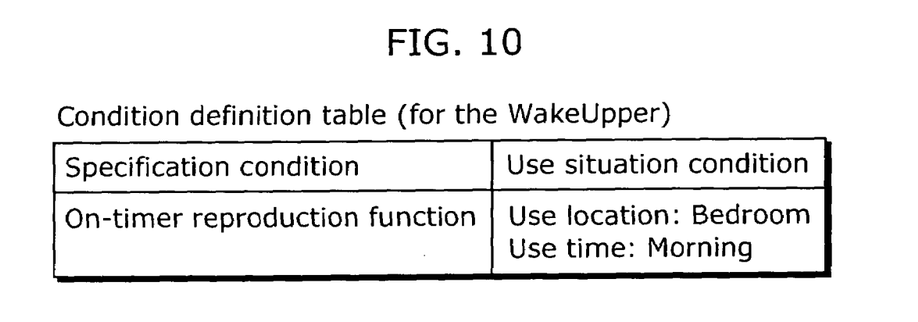
FIG. 10 is a diagram showing the condition definition table after changing a condition.

FIG. 10 is a diagram showing the condition definition table after changing the condition. For the specification condition, a condition meaning "equipped with a function to reproduce a content and the like with an on-timer" is defined. In addition, for the use situation condition, a condition meaning "present in the bedroom in the morning" is defined, as in the first embodiment of the present invention.

Accordingly, the specification-conforming device identification unit 105 identifies the television 14 and the television 15. On the other hand, the use situation-conforming device identification unit 106 identifies the clock 12 and the television 15, as in the first embodiment of the present invention. Therefore, the device identification unit 108 identifies the television 15 as the WakeUpper.

As described above, according to the second embodiment of the present invention, details of the condition definition table can be changed, based on individual circumstances. In other words, a condition for identifying a device to be controlled can be changed without modifying the application.

Furthermore, in the application of the present invention, a device is abstracted from the viewpoint of whether or not the device can carry out a specific role, such as "TimeKeeper", "Wake-Upper", and "Chef". In other words, the application does not describe which function-equipped device is to be adopted as the device to be operated. With this, it is possible to change the specification condition that the device to be operated needs to be equipped with, without modifying the application. In other words, in terms of the example of the tardiness prevention application, it is possible to operate a device equipped with a function other than the alarm function, such as a vibration function and an on-timer reproduction function.

Moreover, in the aforementioned explanation, the structure of changing the details of the condition definition table is described. Here, changing includes addition, deletion and updating. Furthermore, although the structure in which the user designates the details of the change is exemplified, the present invention is not limited to this. In other words, in the case where a sensor which detects the action of a user is provided, the details of the condition definition table can be automatically changed, so as to fit the details of the user's action detected by such sensor.

Moreover, although in the aforementioned explanation, the method for setting information in the specification association table is not particularly mentioned, information is automatically set in the specification association table. For example, a sensor which detects a device in the home is provided, and the specification of the device detected by this sensor is downloaded from the Internet. The downloaded information is automatically set in the specification association table.

Furthermore, information is also automatically set in the use situation association table. In other words, when an IC tag is attached to each device in the home, and a tag reader is provided in each room, the room where each device is used can be identified. Alternatively, it is possible to provide a camera in the home, and the images taken by the camera can be identified. In this manner, it is possible to identify, not only the room where a device is used, but also the user who uses a device. Information identified in such manner is automatically set in the use situation association table.

Moreover, although in the aforementioned explanation, the clock 11, the clock 12, the light 13, the television 14, the television 15 are exemplified as the devices to be controlled, "devices" in the present invention is not limited to such devices. In other words, "devices" include: home appliances, such as an air-conditioner and a laundry machine; audio-visual devices, such as a television, a speaker and a camera; electrical devices which can input and output information, such as an electric bulb, a bell, a switch, a vibrator, and various sensors; information display devices, such as a liquid crystal display and a head mount display; small objects which can input and output information, such as a stuffed-toy type robot, an umbrella with a lamp, and a hanger with a liquid crystal display; information and telecommunications devices, such as a telephone and a fax machine; information processing devices, such as a personal computer and a home server; portable devices, such as a mobile phone and a GPS terminal; public devices, such as an automatic door and a traffic signal; information provider servers, such as a weather forecast server, a traffic information server, and a ranking information server; servers which handle information related to individuals and groups, such as a mail server, a scheduler server, a television program recording server, and a household bookkeeping server; function providing servers, such as a dictionary server, a language translation server, a speech recognition server, an image recognition server, a format conversion server, a data evaluation server, a motion detection function providing server, a hard disk rental server, and a certificate server; and information providing devices, such as an IC card and RFID.

Moreover, although in the aforementioned explanation, the device control unit 109 directly controls the devices 11 to 15, the present invention is not limited to this. In other words, the main subject of this invention lies in a technology which identifies a specific device to be controlled, and the method for controlling the identified device is not particularly limited.

For example, a structure in which the result identified by the device identification unit 108 is notified to another device may be adopted, and not a structure in which the device control unit 109 controls the device identified by the device identification unit 108. In this case, as the devices 11 to 15 are controlled by the notified other device, such other device is included in the device control apparatus 100.

Figure 11:
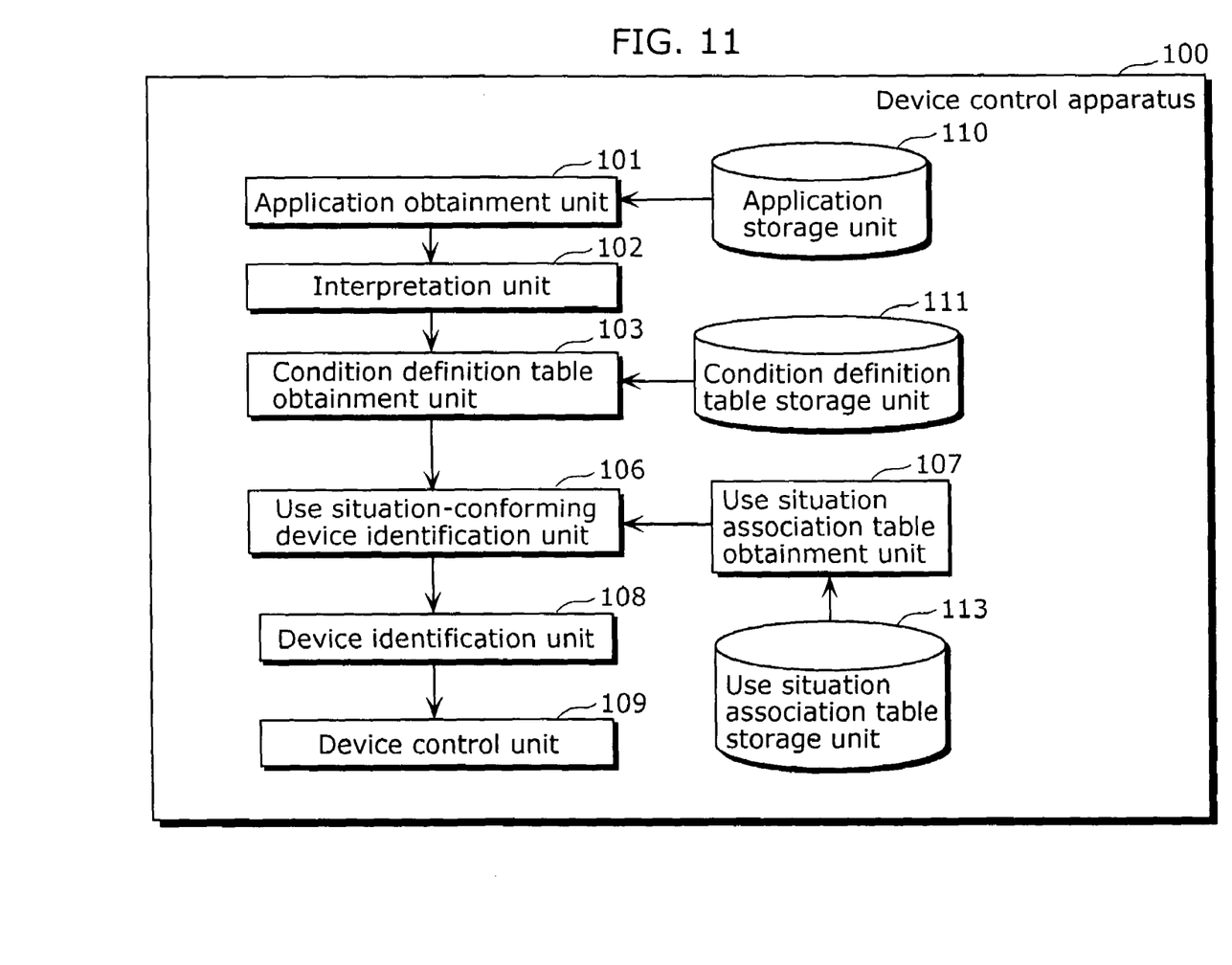
FIG. 11 is a diagram of the structure of the device control apparatus.

Moreover, although in the aforementioned explanation, the structure using both the specification and the use situation of the device is exemplified, the structure using only the use situation of a device as shown in FIG. 11 may be adopted. In this case, the device identification unit 108 identifies a device to be operated among the devices identified by the use situation-conforming device identification unit 106. Though, in the case where the device identified by the use situation-conforming device identification unit 106 unconditionally becomes the device to be controlled, there is no need to provide the device identification unit 108.

As such, in the structure using only the use situation of a device, a required function, such as "a function of turning off the power" is described, in a fixed manner, in the application. Then, when a use situation condition meaning "present on a desk" is defined in the condition definition table, it is possible to realize a system which turns off the power only for the device placed on the desk.

Note that the specification in the present invention refers to the description of a device itself, and the specification can be broadly divided into the function specification and the form specification.

The function specification refers to the description of the operation conducted by a device, such as a video display function, a sound input function, a vibration function, a user recognition function, an information recording function, an information filtering function, an information personalizing function, and an information processing function. On the other hand, the form specification refers to the description of the physical characteristic of a device, such as: the shape, size, mass, color, and material of the device; the number, location, shape, and color of a button; a use environment condition; the type and number of information input and output terminals; power consumption and battery duration time; and media format and corresponding media, such as printer paper, a magnetic disc, and semi-conductor media.

Figure 12:
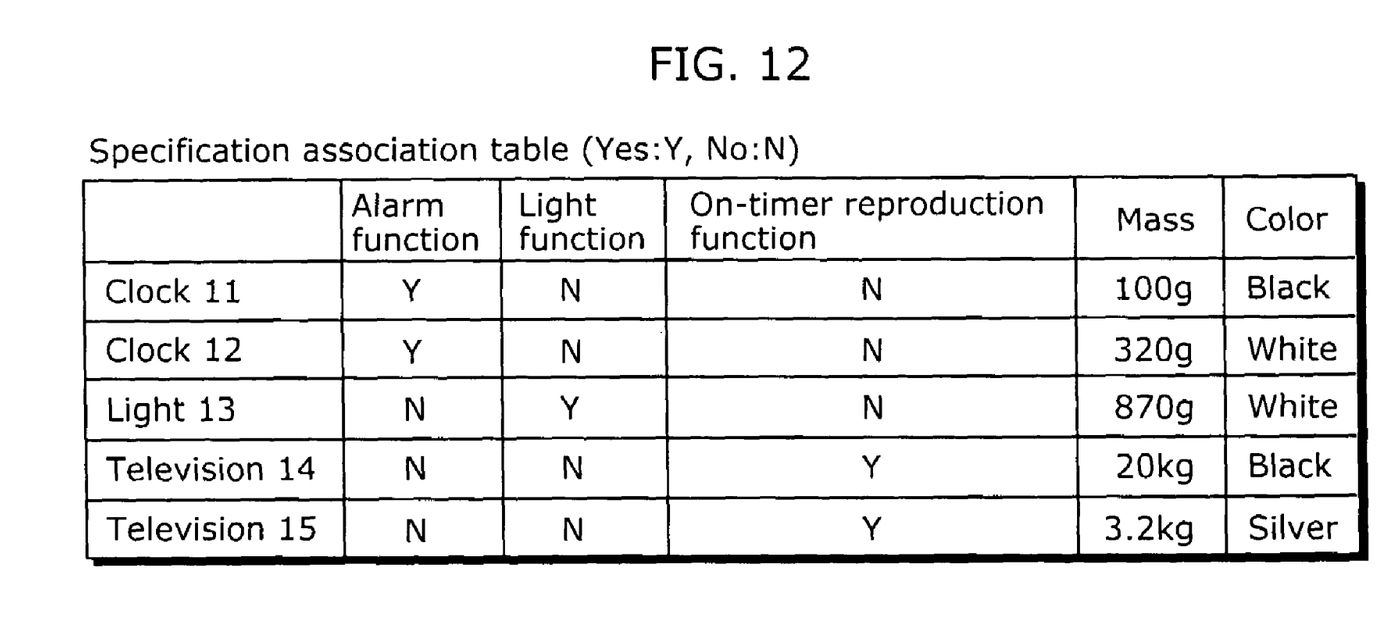
FIG. 12 is a diagram showing the specification association table.
Figure 13:
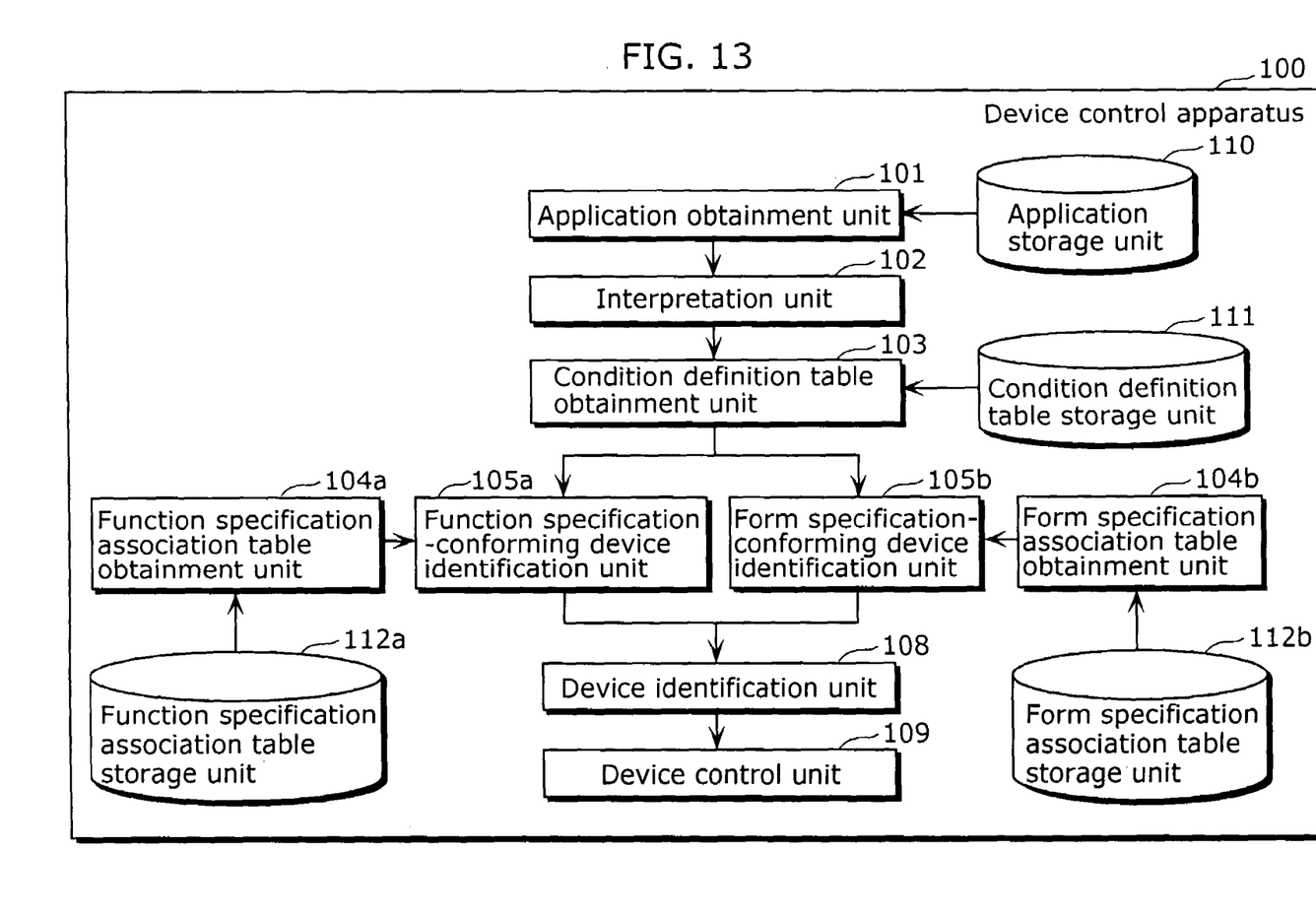
FIG. 13 is a diagram of the structure of the device control apparatus.

FIG. 12 is a diagram showing another example of a specification association table. As shown in this diagram, it is possible to set, not only the function specification, but also the form specification, such as "mass" and "color" in the specification association table. Of course, it is possible to set the function specification and the form specification in separate specification association tables, instead of setting both in one specification association table. In this case, as shown in FIG. 13, it is possible to provide a storage unit 112a, an obtainment unit 104a, and a conformance judgment unit 105a for the function specification association table, and at the same time to provide a storage unit 112b, an obtainment unit 104b, and a conformance judgment unit 105b for the form specification association table.

In this manner, according to the structure using not only the function specification but also the form specification, for example, it is possible to define a function specification condition "equipped with a music reproduction function", and at the same time, to define a form specification condition as "the mass is less than 100 g". With this, it is possible to realize a system for identifying a lightweight device appropriate for listening to music outdoors.

Note that "the use situation of a device" in the present invention is the relationship between the device and the real world. The relationship between the device and the real world refers to: the use location of the device; the use time; the manipulation performed by the user on the device; the operation performed by the device in accordance with such manipulation; the situation of the user who is in contact with the device (such as when waking up, when commuting, in an emergency, and in a conversation); an attribute of the belongings of the user who is in contact with the device (such as color of the clothes and capacity of a bag); an object beneath the device, such as furniture; another device physically present near the device; another device which is near the device in terms of the network; sensing information from the external surroundings; and the state of the device (such as free storage space in the device, remaining amount of battery charge, and the content held).

Although "use location" refers to the location at which the device is used by a user, the location at which the device is present may be included in the "use situation", regardless of the relationship with the user. Likewise, although "use time" refers to the time at which the device is used by the user, the time at which the device is present may be included in the "use situation", regardless of the relationship with the user.

As such, the reason why the concept "the time at which the device is present" is introduced is because there are some devices which are not constantly present in a specific place. For example, there are cases where a mobile phone is present in a work place in the morning, and is present in a bedroom at night. In this case, "morning" and "night" fall under "the time at which the device is present".

Note that "the use situation of a device" is not limited to the current use situation, and may also be the past record of the use situation and a prediction for the use situation. With this, it is possible to appropriately identify a device that can achieve the purpose of the application, from any one of the following viewpoints: the past record of the use situation; the current use situation; and the prediction for the use situation.

Moreover, in the condition definition table, a plurality of the specification conditions and the use situation conditions may be defined for a single device. As the condition for identifying the device to be controlled can be more complex, the device which can achieve the purpose of the application can be identified more appropriately.

In this case, a priority relation can be defined among the plurality of conditions in the condition definition table. With this, it is possible to easily define complex conditions.

Moreover, it is also possible to share a part or the entirety of the condition definition table among plural users. With this, it is possible to use the knowledge of others, and at the same time, to easily define various conditions.

As such, in the case where the plural users share the condition definition table, the condition to be applied may be set differently for each user. In order to set a condition to be applied differently for each user, an ID for distinguishing a user may be used as an attribute of the specification condition and the use situation condition.

Moreover, although in the aforementioned explanation, the hard disk is exemplified as an example of the condition definition table storage unit 111, the present invention is not limited to this. In other words, the condition definition table storage unit 111 may be a file system in which a file which records the specification condition and the use situation condition is stored. The same can be true of the application storage unit 110, the specification association table storage unit 112, and the use situation association table storage unit 113.

Moreover, although the device identification unit 108, the specification-conforming device identification unit 105, and the use situation-conforming device identification unit 106 are supposed to identify a device which exactly matches the respective conditions, the present invention is not limited to this. In other words, even when the device does not exactly match such condition, as long as the device nearly satisfies such conditions, the device may be identified.

Moreover, the operation, in the case where plural devices are identified by the device identification unit 108, is not particularly limited. In other words, the plural devices may be operated, or only one among the plural devices may be operated. In order to operate only one of the devices, information showing the priority relation among the devices can be set in the specification association table and the use situation association table.

Moreover, each unit described in the FIG. 2 may not necessarily be in a single computer. For example, the application storage unit 110, the condition definition table storage unit 111, the specification association table storage unit 112, and the use situation association table storage unit 113 can be placed in another computer, which is different from the device control apparatus 100. In this case, the application, the condition definition table, the specification association table, and the use situation association table are obtained, from the aforementioned other computer, by the respective obtainment units 101, 103, 104, and 107.

Moreover, a plurality of each unit described in FIG. 2 may be present. For example, a plurality of the device identification unit 108 and the device control unit 109 can be present to match the number of the users.

Moreover, the present invention can be realized, not only as the aforementioned device control apparatus, but also as a device control method having the characteristic units of the aforementioned device control apparatus as steps, and as a program causing a computer to execute such steps. Furthermore, it goes without saying that such program can be distributed via a recording medium, such as a CD-ROM and the like, and via a transmission medium, such as the Internet and the like.

INDUSTRIAL APPLICABILITY

The device control apparatus in the present invention can also be applied to a linkage system and the like required to appropriately identify a device that can achieve a purpose of an application.

The invention claimed is:

1. A device control apparatus that controls a plurality of devices, said device control apparatus comprising:

a specification association table obtainment unit operable to obtain a specification association table in which the plurality of devices and a specification of each of the devices are associated with each other;

a use situation association table obtainment unit operable to obtain a use situation association table in which the devices and a use situation of each of the devices are associated with each other;

an application obtainment unit operable to obtain an application program in which a device to be controlled is described by an abstract name;

a condition definition table obtainment unit operable to obtain a condition definition table in which conditions that should be satisfied by the device with the abstract name are defined, the conditions being a specification-related condition and a use situation-related condition;

a specification-conforming device identification unit operable to identify, by referring to the condition definition table, the specification-related condition that should be satisfied by the device with the abstract name described in the application program, and to identify, by referring to the specification association table, each of the devices having the specification which conforms to the identified specification-related condition;

a use situation-conforming device identification unit operable to identify, by referring to the condition definition table, the use situation-related condition that should be satisfied by the device with the abstract name described in the application program, and to identify, by referring to the use situation association table, each of the devices having the use situation which conforms to the identified use situation-related condition;

a device identification unit operable to identify, based on each of the devices identified by said specification-conforming device identification unit and each of the devices identified by said use situation-conforming device identification unit, the device to be controlled, wherein the device to be controlled is a device identified by both of the specification-conforming device identification unit and the use situation-conforming device identification unit; and a device control unit operable to control, based on the application program, the device to be controlled that is identified by said device identification unit, wherein the identification performed by the specification-conforming device identification unit of each of the devices having the specification which conforms to the identified specification-related condition is carried out independently from the identification performed by the use situation-conforming device identification unit of each of the devices having the use situation which conforms to the identified use situation-related condition, wherein, for each of the devices, the use situation of the device includes a physical location and a time, and wherein, for each of the devices, the specification of the device includes a functional specification of the device, and at least one of a shape, a size, a mass, a color, and a use environment condition.

2. The device control apparatus according to claim 1, wherein the abstract name is a generic name of a device that can carry out a specific role.

3. The device control apparatus according to claim 1, wherein a combination of the device with the abstract name and a command to the device is described in the application program.

4. The device control apparatus according to claim 1, further comprising
a change unit operable to change details in the condition definition table.

5. The device control apparatus according to claim 1, wherein the use situation of the device includes a location at which the device is present, and a time at which the device is present.

6. The device control apparatus according to claim 1, wherein the use situation of the device includes a location at which the device is used by a user, and a time at which the device is used by the user.

7. The device control apparatus according to claim 1, wherein the use situation of the device includes any one of a past record of the use situation, a current use situation, and a prediction for the use situation.

8. The device control apparatus according to claim 1, wherein a plurality of conditions that should be satisfied by the device are defined, for a single device, in the condition definition table, the conditions being specification-related conditions and use situation-related conditions.

9. The device control apparatus according to claim 8, wherein a priority relation among the plurality of conditions is defined in the condition definition table.

10. The device control apparatus according to claim 1, wherein a plurality of users can share any of a part and a whole of the condition definition table.

11. A device control method for controlling a plurality of devices, said device control method comprising:
a specification association table obtainment step of obtaining a specification association table in which the plurality of devices and a specification of each of the devices are associated with each other;

a use situation association table obtainment step of obtaining a use situation association table in which the devices and a use situation of each of the devices are associated with each other;

an application obtainment step of obtaining an application program in which a device to be controlled is described by an abstract name;

a condition definition table obtainment step of obtaining a condition definition table in which conditions that should be satisfied by the device with the abstract name are defined, the conditions being a specification-related condition and a use situation-related condition;

a specification-conforming device identification step of identifying, by referring to the condition definition table, the specification-related condition that should be satisfied by the device with the abstract name described in the application program, and of identifying, by referring to the specification association table, each of the devices having the specification which conforms to the identified specification-related condition;

a use situation-conforming device identification step of identifying, by referring to the condition definition table, the use situation-related condition that should be satisfied by the device with the abstract name described in the application program, and of identifying, by referring to the use situation association table, each of the devices having the use situation which conforms to the identified condition;

a device identification step of identifying, based on each of the devices identified in said specification-conforming device identification step and each of the devices identified in said use situation-conforming device identification step, the device to be controlled, wherein the device to be controlled is a device identified in both of said specification-conforming device identification step and said use situation-conforming device identification step; and a device control step of controlling, based on the application program, the device to be controlled that is identified in said device identification step, wherein the identifying performed in said specification-conforming device identification step of each of the devices having the specification which conforms to the identified specification-related condition is carried out independently from the identifying performed in said use situation-conforming device identification step of each of the devices having the use situation which conforms to the identified use situation-related condition, wherein, for each of the devices, the use situation of the device includes a physical location and a time, and wherein, for each of the devices, the specification of the device includes a functional specification of the device, and at least one of a shape, a size, a mass, a color, and a use environment condition.

12. A computer-readable recording medium on which a program for controlling a plurality of devices is recorded, the program causing a computer to execute a method comprising:

an application obtainment step of obtaining an application program in which a device to be controlled is described by an abstract name;

a condition definition table obtainment step of obtaining a condition definition table in which conditions that should be satisfied by the device with the abstract name are defined, the conditions being a specification-related condition and a use situation-related condition;

a specification-conforming device identification step of identifying each of the plurality of devices which conforms to the specification-related condition that should be satisfied by the device with the abstract name described in the application program;

a use situation-conforming device identification step of identifying each of the plurality of devices which conforms to the use situation-related condition that should be satisfied by the device with the abstract name described in the application program;

a device identification step of identifying, based on each of the devices identified in said specification-conforming device identification step and each of the devices identified in said use situation-conforming device identification step, the device to be controlled, wherein the device to be controlled is a device identified in both of said specification-conforming device identification step and said use situation-conforming device identification step; and a device control step of controlling, based on the application program, the device to be controlled that is identified in said device identification step, wherein the identifying performed in said specification-conforming device identification step of each of the devices having the specification which conforms to the identified specification-related condition is carried out independently from the identifying performed in said use situation-conforming device identification step of each of the devices having the use situation which conforms to the identified use situation-related condition, wherein, for each of the devices, the use situation of the device includes a physical location and a time, and wherein, for each of the devices, the specification of the device includes a functional specification of the device, and at least one of a shape, a size, a mass, a color, and a use environment condition.

* * * * *